(12) United States Patent
Modesto

(10) Patent No.: US 7,670,398 B2
(45) Date of Patent: Mar. 2, 2010

(54) FILTER SYSTEM

(75) Inventor: Daniel Modesto, Plainfield, IL (US)

(73) Assignee: TDC Filter Manufacturing, Inc., Niles, IL (US)

( * ) Notice: Subject to any disclaimer, the term of this patent is extended or adjusted under 35 U.S.C. 154(b) by 343 days.

(21) Appl. No.: 11/692,345

(22) Filed: Mar. 28, 2007

(65) Prior Publication Data

US 2007/0227106 A1    Oct. 4, 2007

Related U.S. Application Data

(60) Provisional application No. 60/787,007, filed on Mar. 29, 2006.

(51) Int. Cl.
*B01D 46/02* (2006.01)

(52) U.S. Cl. .......................... 55/374; 55/341.1; 55/376; 55/379; 55/492; 55/493; 55/498; 55/502; 55/508

(58) Field of Classification Search ................ 55/341.1, 55/361, 374, 375, 376, 377, 378, 379, 492, 55/493, 498, 502, 508
See application file for complete search history.

(56) References Cited

U.S. PATENT DOCUMENTS

| | | | | | |
|---|---|---|---|---|---|
| 2,338,504 | A | * | 1/1944 | Foster | 55/374 |
| 2,574,412 | A | * | 11/1951 | Pringle | 55/350.1 |
| 3,097,410 | A | * | 7/1963 | Lincoln | 24/270 |
| 3,170,777 | A | * | 2/1965 | Held | 55/490 |
| 3,538,687 | A | * | 11/1970 | Pausch | 55/379 |
| 3,618,300 | A | * | 11/1971 | Pausch | 96/427 |
| 4,015,961 | A | * | 4/1977 | Howard et al. | 55/378 |
| 4,073,632 | A | * | 2/1978 | Reinauer et al. | 55/374 |
| 4,194,894 | A | * | 3/1980 | Noland | 55/379 |
| 4,220,459 | A | * | 9/1980 | Hammond et al. | 55/341.1 |
| 4,289,511 | A | * | 9/1981 | Johnson, Jr. | 55/302 |
| 4,310,336 | A | * | 1/1982 | Peterson | 55/377 |
| 4,435,197 | A | * | 3/1984 | Nijhawan et al. | 55/341.7 |
| 5,057,131 | A | * | 10/1991 | Lackner et al. | 55/369 |
| 5,290,441 | A | * | 3/1994 | Griffin et al. | 210/232 |
| 5,308,369 | A | * | 5/1994 | Morton et al. | 55/379 |
| 5,308,485 | A | * | 5/1994 | Griffin et al. | 210/232 |
| 5,746,792 | A | * | 5/1998 | Clements et al. | 55/341.1 |
| 5,785,724 | A | * | 7/1998 | Johnson | 55/377 |
| 5,885,314 | A | * | 3/1999 | Oussoren et al. | 55/486 |
| 5,964,909 | A | * | 10/1999 | Brunner | 55/377 |
| 6,299,662 | B1 | * | 10/2001 | Poulsen | 55/498 |
| 6,626,970 | B2 | * | 9/2003 | Pipkorn et al. | 55/379 |
| 6,726,735 | B1 | * | 4/2004 | Oussoren et al. | 55/377 |
| 6,790,250 | B2 | * | 9/2004 | Pipkorn et al. | 55/379 |
| 6,858,052 | B2 | * | 2/2005 | Clements | 55/377 |

\* cited by examiner

*Primary Examiner*—Michael A Marcheschi
*Assistant Examiner*—Robert A Clemente
(74) *Attorney, Agent, or Firm*—Ungaretti & Harris LLP

(57) ABSTRACT

A filter element (10) is disclosed having a integral clamp (100) thereon. The adjustable clamp (100) is held against a sleeve (90) by attached tabs (91). The sleeve (90) covers a collar (70) with a plurality of fingers (72) thereon. A high head, e.g., the apex, formed by a bead (80) in the fingers (72) permits better sealing between the filter (10) and the filter's support housing.

19 Claims, 9 Drawing Sheets

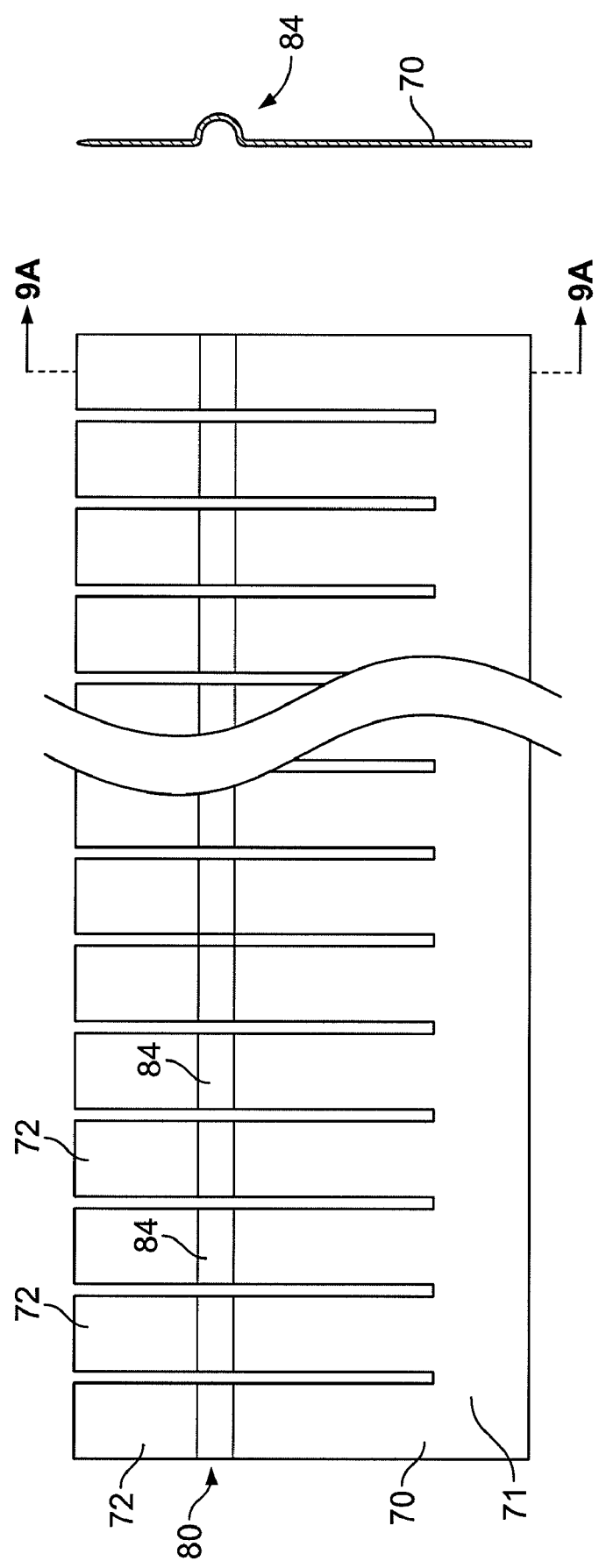

FILTER SYSTEM

RELATED APPLICATION

This Application claims the benefit of Provisional Patent Application Ser. No. 60/787,007 filed Mar. 29, 2006.

TECHNICAL FIELD

The present invention relates to filters, and more particularly, to a bottom load baghouse filter element.

BACKGROUND OF THE INVENTION

Industrial facilities often discharge particle or dust laden exhaust. Consequently, government regulations and standards regulate such exhaust. As a result, particle/dust collection or recovery systems, such as baghouses and cyclone separators, are used for the removal of the particles and dust before further processing of the exhaust, if necessary, and release to the atmosphere. For example, while baghouses remove particulate from the gas stream, the exhaust may also need to be treated to remove other non-particulate dangers such as sulfur dioxide, nitrogen oxides, volatile organic compounds, and carbon monoxide. The dust and gas conveyed to a baghouse or other similar air or gas filtering system are separated; the dust is separated and collected for disposal or later use while the cleaned gases are vented to the atmosphere or further processing.

Currently, baghouses are employed at many manufacturing facilities, stationary and portable, for cost effective compliance with emission requirements. The filters are generally two or more sided structures with a central opening. The baghouse operates by allowing the gas stream to pass through the walls of the filters, catching the particles on the bag's walls. Thus, if the flow of dirty air is from outside the filter (to the inside of the filter and out an outlet), particles will be caught on the outer surface of the filter. To the extent the filters have a mesh or screen size, particles larger than the mesh or screen size are caught on and in the exposed filter surface.

Other similar filtering processes such as fiber collectors and clean rooms operate in similar manners. These systems essentially collect particulate material and/or moisture from an incoming stream and separate the particulate or moisture from the cleaned gas stream. For example, fiber collectors are utilized in places such as cotton processing facilities to separate cotton fiber and dust from exhaust gas streams produced in the manufacturing facility. Clean rooms also utilize filtered gas streams, but instead of exhausting a cleaned gas stream to the ambient atmosphere, clean rooms often utilize filtered ambient atmosphere by removing particulate and moisture before exhausting the cleaned gas into the clean room.

As the above mentioned baghouses/filtering equipment operate, the particles begin to clog the filters and restrict, or choke, the flow of the gas stream. The phenomena occurs because particles will get captured in the filter's mesh and cling or hold to the mesh. As the particles collect/cling, they build up on the mesh structure itself and on other captured particles. The result of this build-up is the steady reduction of the mesh size or opening. This clinging process can continue until the mesh openings are totally blocked, preventing and choking the flow of any further gas (dirty air) through the filter walls. Accordingly filters must be properly cleaned or replaced regularly.

SUMMARY OF THE INVENTION

The present development is an improvement upon existing filter systems. The present invention is a filter featuring a new sealing design and an assembly to facilitate installation of the filter. In particular, an integral retainer clamp is attached to the filter and a higher sealing bead is added to the filter to not only make installation of the filter easier, but to also reduce, if not eliminate, improper installation of the filter and increase the sealing of the filter. This new design further greatly reduces the labor costs associated with installation of the filter. Specifically, whereas in the past it normally takes two people to install the filter, the filter of the present invention, can be installed by one person.

In one aspect of the invention, a filter element comprises a filter medium, a rigid frame, and a sleeve. The rigid frame has an end adapted for attachment to a recovery system. The end has a collar extending outwardly therefrom. The sleeve is around the collar. The sleeve includes a first retainer for engagement with a means for attaching the element to a recovery system. The sleeve may cover the collar, may be sealed to the frame, and/or may be produced from an industrial fabric. The collar may comprise a plurality of upwardly extending fingers. Each finger may have a radially inwardly extending protuberance aligned with a protuberance of an adjacent finger to form an annular bead in the collar. The annular bead may have an inner radius of about 0.090 inches.

The filter element may further comprise an adjustable clamp for attaching the filter element to a recovery system. The retainer may have a slot for receiving the adjustable clamp therethrough.

The filter element may further comprise a second retainer spaced at least 90 degrees from the first retainer.

In another aspect of the present invention, a filter element comprises a filter medium and a rigid frame. The rigid frame supports the filter medium. The frame has an end adapted for attachment to a recovery system. The end has a collar including a bead formed therein. The bead extends radially inwardly and has an inner radius of about 0.090 inches. The collar may comprise a plurality of annularly arranged, spaced fingers. Each finger may include a protuberance aligned with a protuberance on an adjacent finger to form the bead.

In another aspect of the invention, a filter element comprises a frame, a filter medium, a collar, a sleeve, and an adjustable clamp. The frame comprises an inner core, a first end cap, and a second end cap. The filter medium is wrapped about the inner core. The collar extends upwardly relative to one of the end caps. The collar has a base portion and a plurality of annularly arranged fingers extending upwardly therefrom. The sleeve is wrapped about the collar. The sleeve has a retainer on an outer surface. The adjustable clamp is wrapped about the sleeve and retained thereto by the retainer. The inner core may be a cylindrical screen secured to the first and second end caps. The first end cap may be closed, and the second end cap may have an opening therethrough. The filter medium may have a pleat structure and may be sealed to the first and second end caps.

The filter element may further comprise an annular U-shaped member fixedly attached to an upper surface of the second end cap. The annular U-shaped member may have a first wall parallel to and located radially outwardly of a second wall. The first and second walls may be joined by a base portion wherein the collar is fixedly attached to the first wall and the sleeve surrounds the collar to cover the collar.

The filter element may further comprise a first sealant within the U-shaped member sealing a portion of the sleeve within the U-shaped member.

The filter element may further comprise a second sealant located radially outwardly of the first wall of the U-shaped member and sealing the sleeve along a lower end of the sleeve located adjacent the second end.

Other advantages and aspects of the present invention will become apparent upon reading the following description of the drawings and the detailed description of the invention.

BRIEF DESCRIPTION OF THE DRAWINGS

Following are the brief descriptions and legends of the figures.

FIG. 9 is a side view showing the details of the collar 70; and

FIG. 9A is a cross-sectional view taken along A-A of FIG. 9.

DETAILED DESCRIPTION OF THE INVENTION

Figure 1:
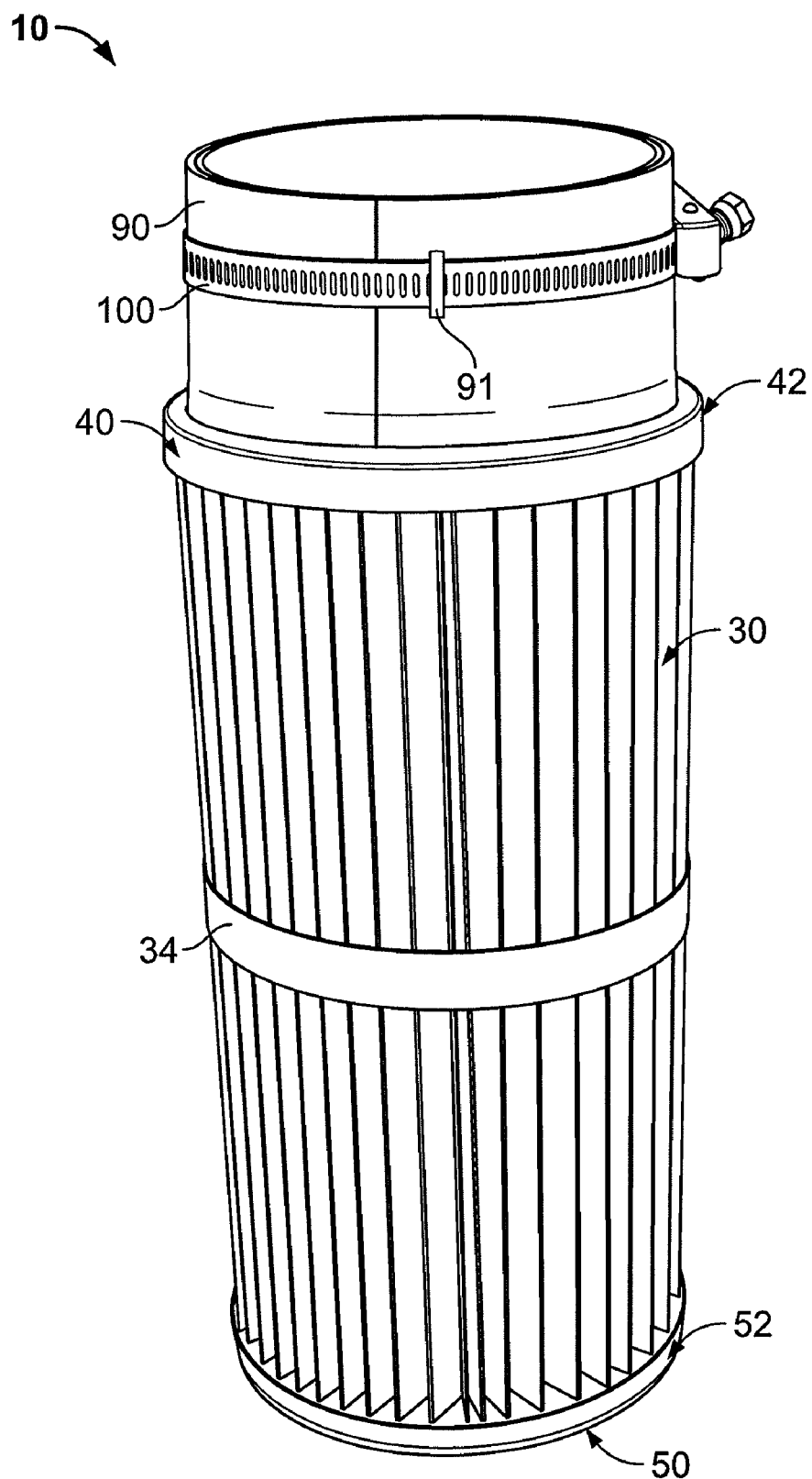
FIG. 1 is a top perspective view of the filter element 10.
Figure 2:
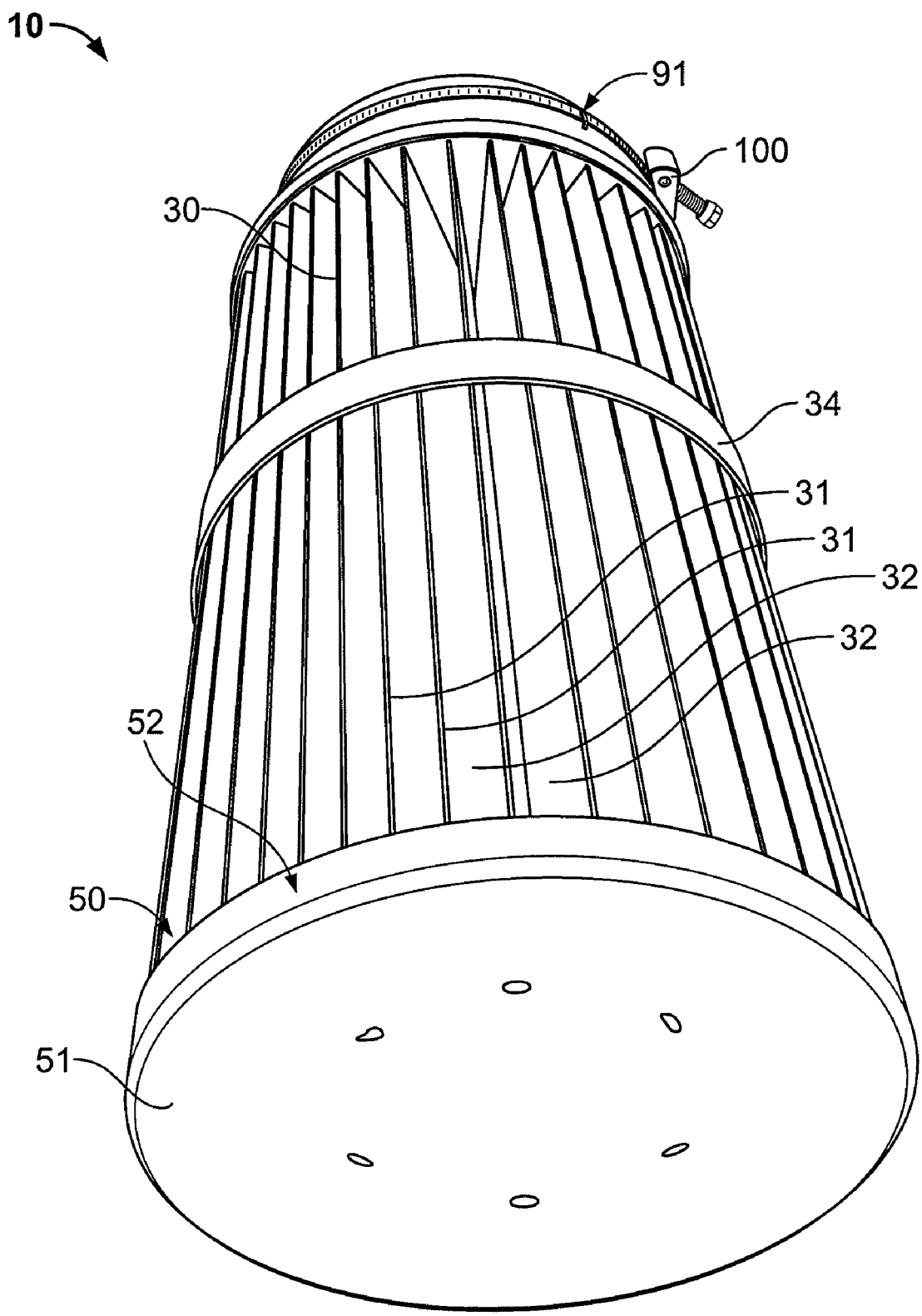
FIG. 2 is a side perspective view showing the second end cap 50.
Figure 3:
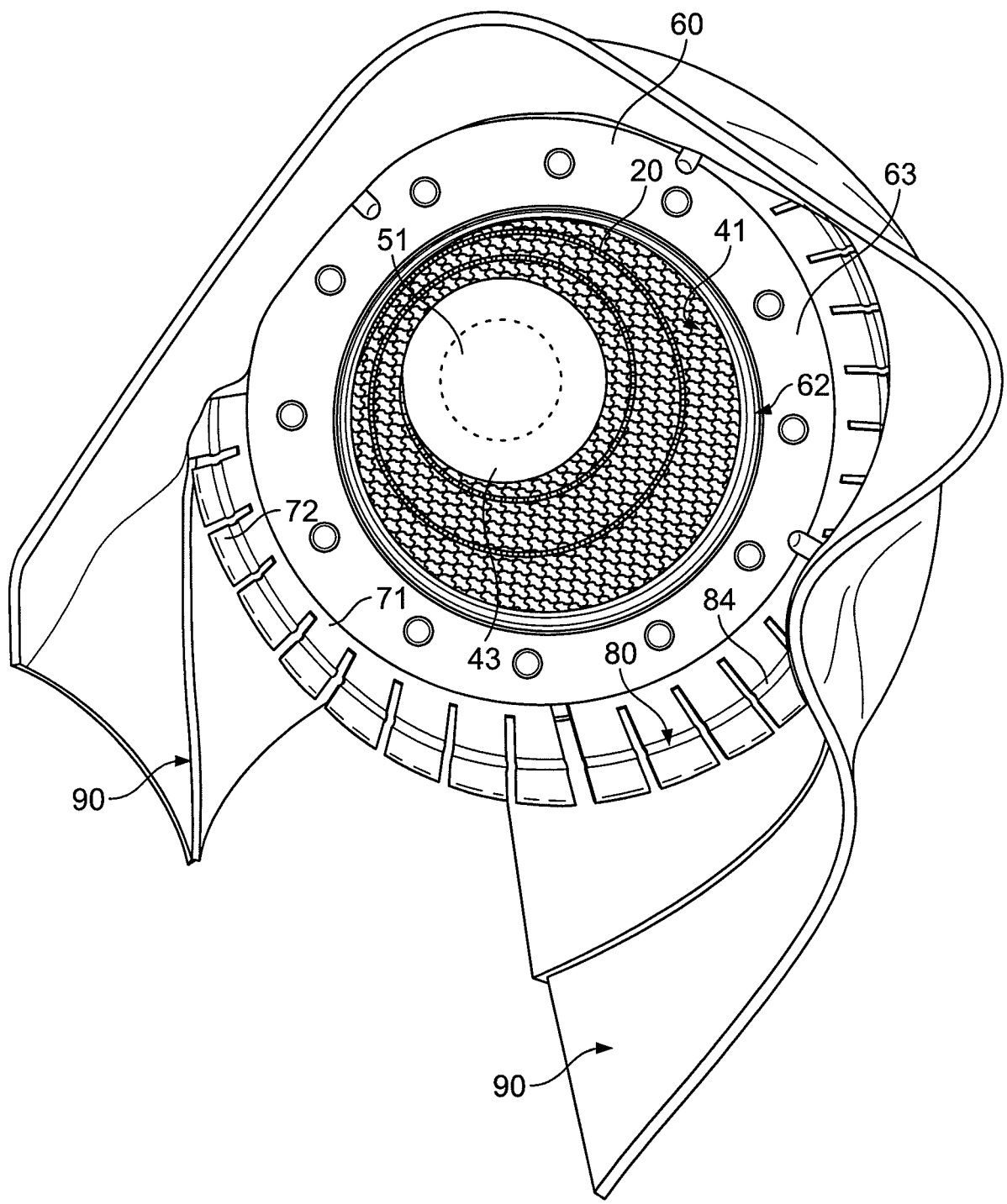
FIG. 3 is a top view showing the inside of the filter 10 and with the sleeve 90 cut and pulled off of the collar 70 and U-shaped member 60.
Figure 4:
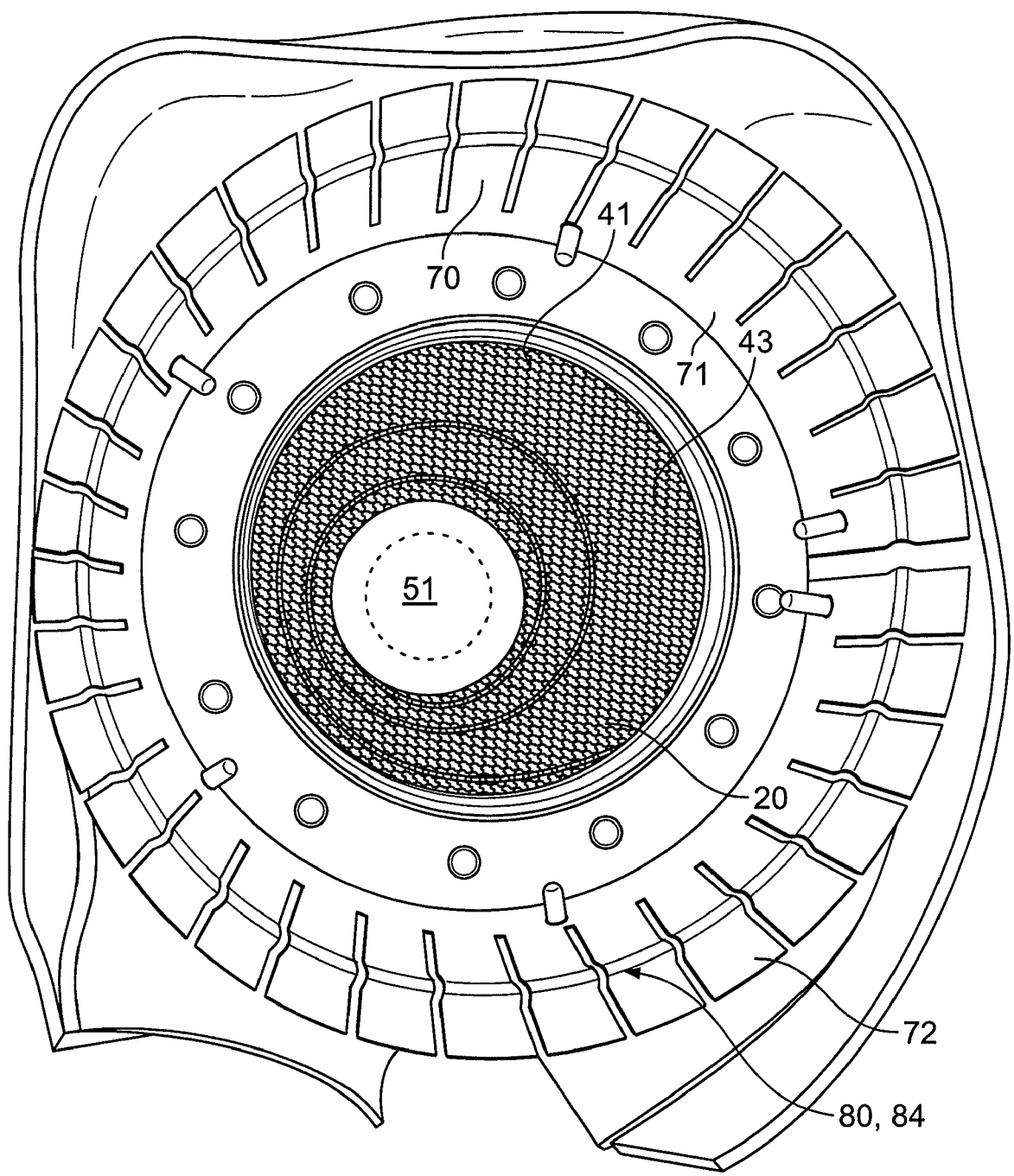
FIG. 4 is a magnified view of the filter as shown in FIG. 3.
Figure 5:
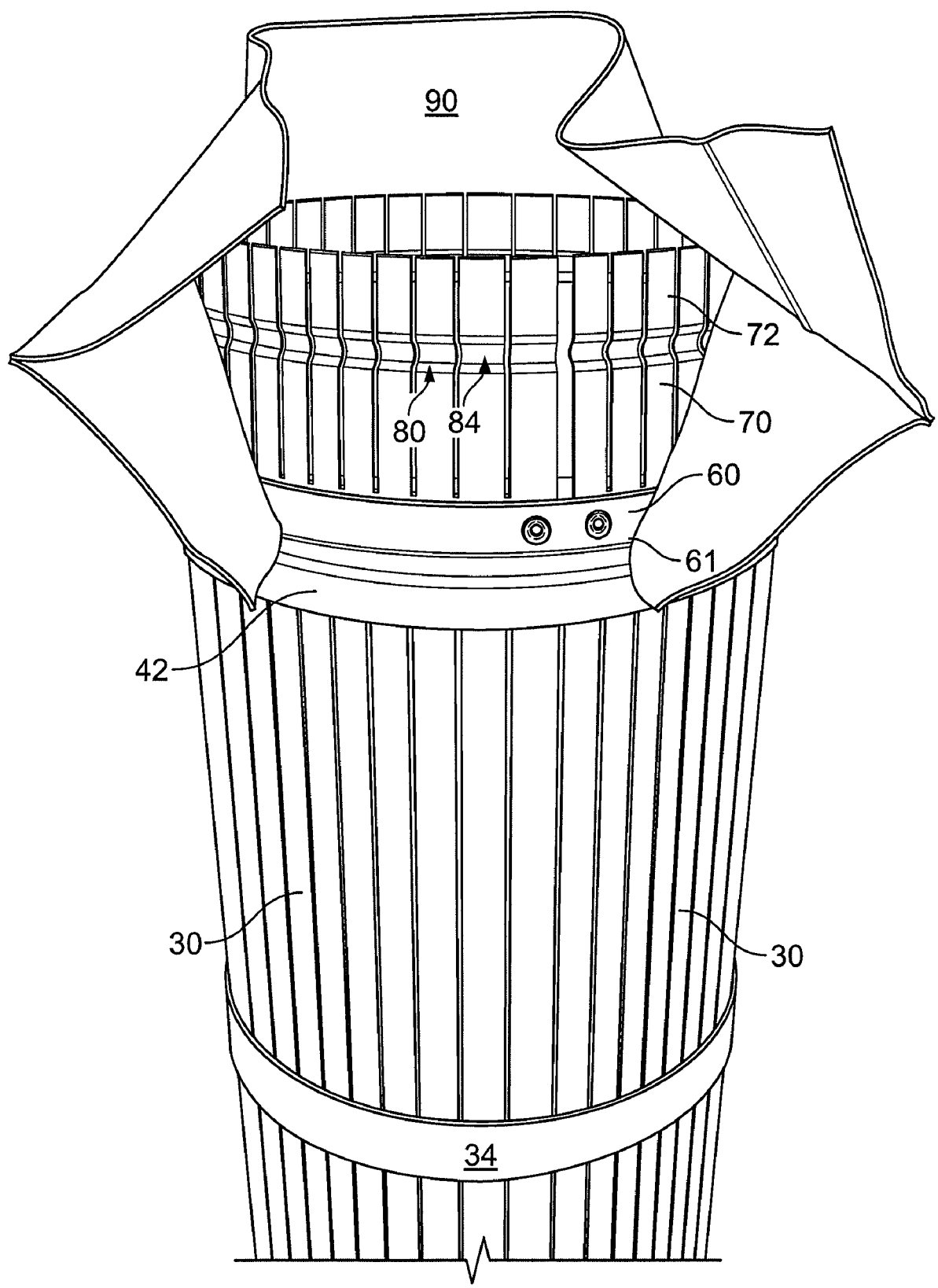
FIG. 5 is a side view showing the filter 10 again with the sleeve 90 cut and pulled off the collar 70.
Figure 6:
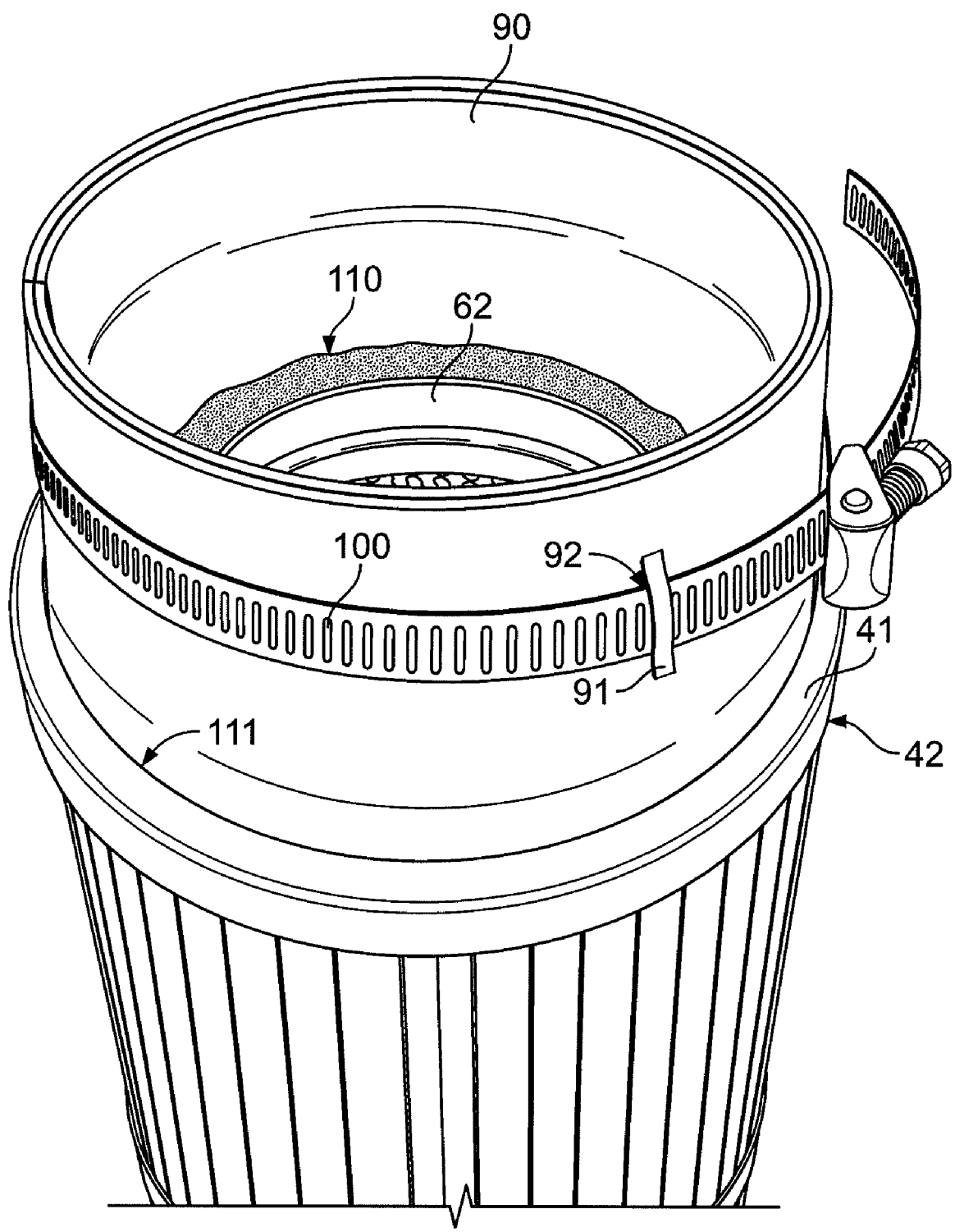
FIG. 6 is a top perspective view showing the sleeve 90 in its normal operating position, the inner sealant 110, a tab 91 and the adjustable clamp 100.

While this invention is susceptible of embodiments in many different forms, there is shown in the drawings and will herein be described in detail, preferred embodiments of the invention with the understanding the present disclosure is to be considered as an exemplification of the principles of the invention and is not intended to limit the broad aspect of the invention to the embodiments illustrated. The present invention will have the following main components and techniques for operation of the device.

Figure 7:
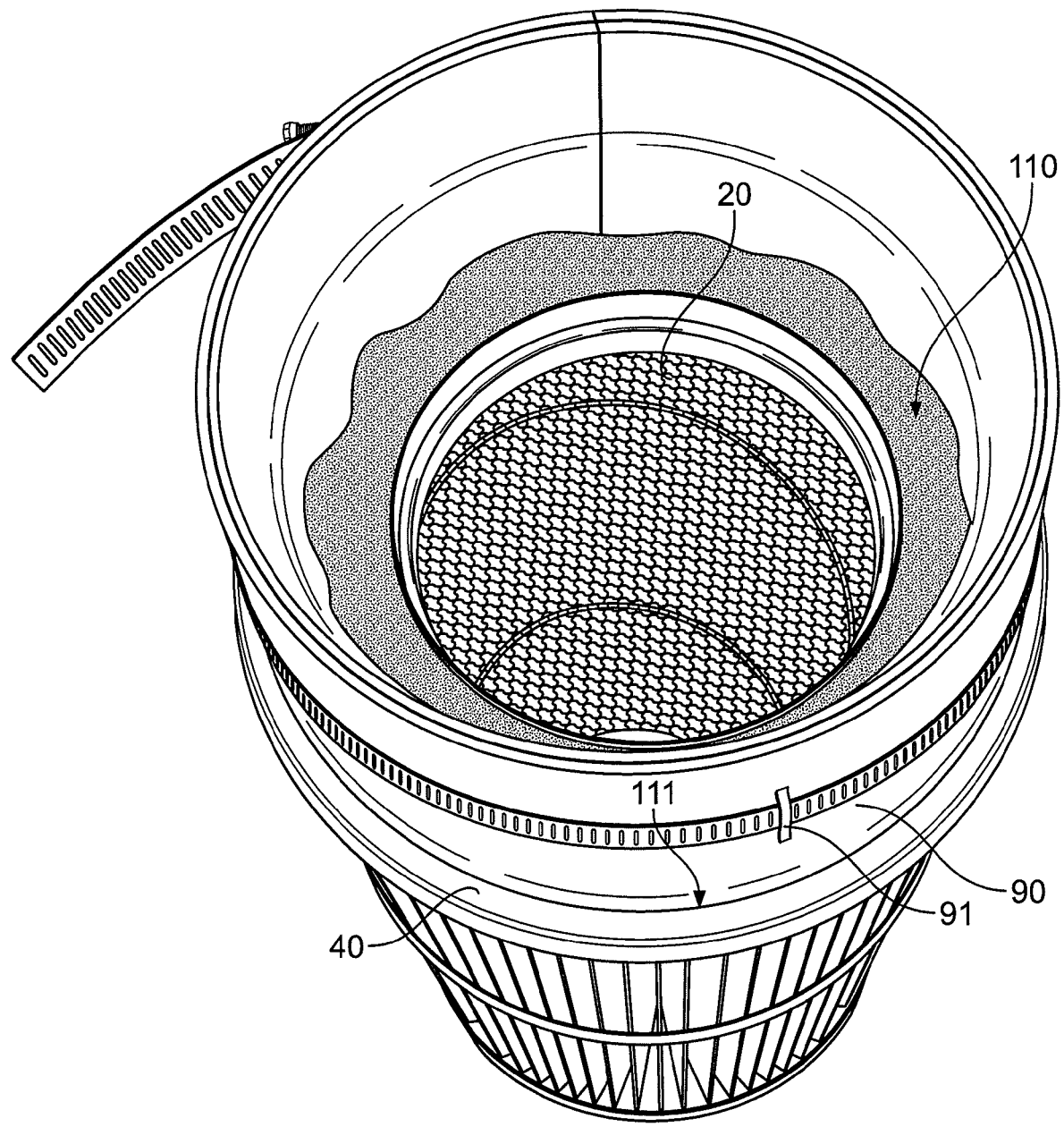
FIG. 7 is a top perspective view, like FIG. 6, taken at a slightly different angle to the filter 10.
Figure 8:
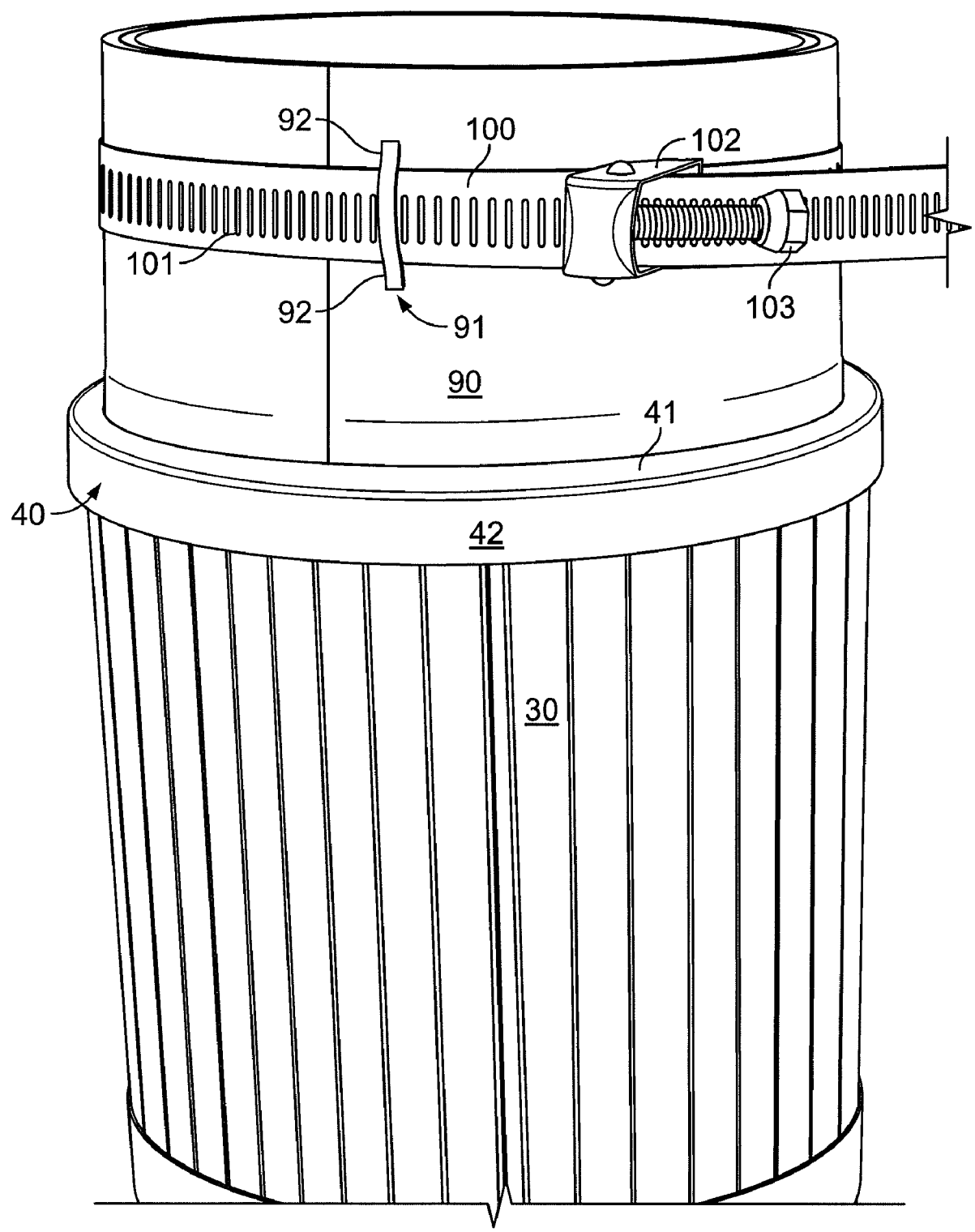
FIG. 8 is a side view showing the sleeve 90, a tab 91 and the adjustable clamp 100.

FIGS. 1-8 show a filter element, designated generally by reference number 10. The filter 10 includes a rigid metal cylindrical screen core 20. The mesh size of the screen 20 is customized to the purpose of the filter 10. As shown in FIG. 7, the core is an open helix configuration. The core 20 is surrounded by a radially projecting pleated filter element 30 (forming ridges 31 and grooves 32) secured between a first end cap 40 and second end cap 50. The screen 20 is also secured to the end caps 40,50, such as by welding, rivets, or toggle locks or by interconnecting the parts mechanically.

The second end cap 50 has a closed rear surface 51 and an annular perimeter lip 52 projecting towards the first end cap 40. The first end cap 40 has a radial flange 41 directed towards the center of the filter 10 forming a central opening 43. This cap 40 also has an annular perimeter lip 42 projecting towards the second end cap 50. The pleated filter medium 30 is positioned against and abutting the cylindrical screen core 20 between the two inner flanges 42,52 of the end caps 40,50 and sealed to the end caps 40,50. The pleated filter medium 30 is cylindrically wrapped around the core so that the pleat tips and valleys 31 project radially and outwardly. It should be known that pleated filters can double, or in some cases, triple a baghouse's efficiency and notably extend filter life. One or more securing bands 34 surround the pleated filter medium 30. The bands 34 are adhesively adhered to the ridges 31 of the filter medium 30.

An internal U-shaped member 60 has concentric annular projecting walls 61,62 projecting from a base 63 upwardly and away from the core 20 of the filter 10. The base 63 is secured to the base of the first end cap 40 by mechanical means, such as rivets or toggle locks. The outer annular wall 61 supports a collar 70. The collar 70 has a base section 71 and a plurality of annularly arranged fingers 72 projecting upwardly and away from the core 20. A bead 80 is formed, such as by metal stamping, in the projecting fingers 72 of the collar 70. This bead 80 is formed by a plurality of protuberances 84 formed in the fingers 72. Specifically, each finger 72 has a inwardly projecting protuberance 84 formed therein and aligned with the protuberance 84 formed in the adjoining finger 72. The bead 80 and protuberances 84 project radially and inwardly towards the center of the filter 10.

As shown in the shop print of FIGS. 9 and 9A, the inside radius of the protuberance 84 is about 0.090 inches. This is larger than protuberances in the prior art. A high head, or protuberance depth, of about 0.20 inches permits better sealing between the filter 10 and the housing (mounting hub and/or venturi) when the filter is installed in the filter housing.

A sleeve 90 covers the collar 70 and the outer annular projecting wall 61 of the U-shaped support 60. The sleeve 90 has a plurality of tabs 91 attached thereto, such as by sewing, to the exterior thereof with each tab 91 having a slot or opening 92 cut or formed therein. An adjustable clamp 100 is threaded through the center slots/opening 92 of the tabs 91 to hold the band 101 of the clamp 100 against the exterior surface of the sleeve 90. In the embodiment shown, two tabs 91 about 170°-180° apart, are shown attached to the sleeve 90. The adjustable clamp 100 has a slotted band 101 that is looped, a support or housing 102 for permitting the screw adjuster/tightener 103 to adjust the size of the loop formed by the band. Adjustable clamps 100 of this kind are available under the mark SNAPLOCK for Stainless Steel Clamp Bands and are manufactured by Portals Plus, Inc., Bensenville, Ill. or others.

A first sealant/adhesive, inner potting, 110, secures one end of the sleeve 90 to the U-shaped support 60 and a second sealant/adhesive 111 secures the other end of the sleeve 90 to the end annular flange 41 of the first end cap 40.

As to materials, the core 20, end caps 40,50, U-shaped support 60 and collar are preferably made of galvanized steel. The sleeve 90 is preferably made of an industrial fabric well known to those in the art for particular applications, while the pleated filter element 30 and band 34 are made with appropriate filter material for the application. A filter of this design is appropriate in temperatures ranging from 200° F. to 375° F. Different materials and media can permit the filter to work in harsher environments, such as 600° F.

By using tabs 91 to hold the adjustable clamp 100, the filter 10 can be installed into the housing by one person. It is not necessary for two people to center, insert, hold, and clamp the filter into place. With the designed integral clamp, one person can insert and hold the filter and then clamp the filter into place. In addition, by increasing the head or height of the bead 80 on the fingers 72 of the collar, the sealing between the filter 10 and housing is much better.

Specifically, the filter 10 described herein is designed for use in a bottom load baghouse. The baghouse has downwardly hanging cylindrical mounting hubs and/or venturis with a cylindrical groove therein. The filter 10 is lifted up so that the open mounting hub and/or venturi fits within the sleeve and bead sits in the groove. While lifted, the clamp is tightened to secure the filter to the mounting hub and/or venturi. When completed, dirty exhaust enters the filter from the outside of the filter, passes to the interior of the filter and through the mounting hub and/or venturi. The pleated filter element captures the particles and clean air is passed into the mounting hub and/or venturi and then to the surrounding environment or further processing.

As used herein, the terms "first," "second," "third," etc. are for illustrative purposes only and are not intended to limit the embodiments in any way. Additionally, the term "plurality" as used herein is intended to indicate any number greater than one, either disjunctively or conjunctively as necessary, up to an infinite number.

While the specific embodiments have been illustrated and described, numerous modifications come to mind without significantly departing from the spirit of the invention, and the scope of protection is only limited by the scope of the accompanying Claims.

I claim:

1. A filter element comprising:
   a filter medium;
   a rigid frame having an end adapted for attachment to a recovery system, the end having a collar extending outwardly therefrom; and
   a sleeve around the collar, the sleeve including a first retainer for engagement with a means for attaching the filter element to a recovery system.

2. The filter element of claim 1 further comprising an adjustable clamp for attaching the filter element to a recovery system.

3. The filter element of claim 1 further comprising a second retainer spaced at a least 90 degrees from the first retainer.

4. The filter element of claim 1 further comprising an adjustable clamp wherein the retainer has a slot for receiving the adjustable clamp therethrough.

5. The filter element of claim 1 further comprising a bead in the collar, the bead extending radially inwardly.

6. The filter element of claim 1 wherein the collar includes a bead, the bead extending radially inwardly and having an inner radius of curvature of about 0.090 inches.

7. The filter element of claim 1 wherein the sleeve covers the collar.

8. The filter element of claim 1 wherein the sleeve is sealed to the frame.

9. The filter element of claim 1 wherein the collar comprises a plurality of upwardly extending fingers, each finger having a radially inwardly extending protuberance aligned with a protuberance of an adjacent finger to form an annular bead in the collar, the annular bead having an inner radius of about 0.090 inches.

10. The filter element of claim 1 wherein the sleeve is produced from an industrial fabric.

11. A filter element comprising:
    a filter medium;
    a rigid frame supporting the filter medium, the frame having an end adapted for attachment to a recovery system, the end having a collar comprising a plurality of annularly arranged, spaced fingers and a bead formed therein, the bead extending radially inwardly and having an inner radius of about 0.090 inches.

12. The filter element of claim 11 wherein each finger includes a protuberance aligned with a protuberance on an adjacent finger to form the bead.

13. The filter element of claim 11 wherein the bead has a high head of about 0.20 inches to permit better sealing between the filter and a recovery system.

14. A filter element comprising:
    a frame comprising an inner core, a first end cap, and a second end cap;
    a filter medium about the inner core;
    a collar extending upwardly relative to one of the end caps, the collar having a base portion and a plurality of annularly arranged fingers extending upwardly therefrom;
    a sleeve wrapped about the collar, the sleeve having a retainer on an outer surface; and
    an adjustable clamp wrapped about the sleeve and retained thereto by the retainer.

15. The filter element of claim 14 wherein the first end cap is closed, and the second end cap has an opening therethrough.

16. The filter element of claim 15 wherein the filter medium has a pleat structure and is sealed to the first and second end caps.

17. The filter element of claim 16 further comprising:
    an annular U-shaped member fixedly attached to an upper surface of the second end cap, the annular U-shaped member having first wall parallel to and located radially outwardly of a second wall, the first and second walls joined by a base portion wherein the collar is fixedly attached to the first wall and the sleeve surrounds the collar to cover the collar.

18. The filter element of claim 17 further comprising:
    a first sealant within the U-shaped member sealing a portion of the sleeve within the U-shaped member.

19. The filter element of claim 18 further comprising:
    a second sealant located radially outwardly of the first wall of the U-shaped member and sealing the sleeve along a lower end of the sleeve located adjacent the second end.

* * * * *

UNITED STATES PATENT AND TRADEMARK OFFICE
CERTIFICATE OF CORRECTION

| | | |
|---|---|---|
| PATENT NO. | : 7,670,398 B2 | Page 1 of 1 |
| APPLICATION NO. | : 11/692345 | |
| DATED | : March 2, 2010 | |
| INVENTOR(S) | : Daniel Modesto | |

It is certified that error appears in the above-identified patent and that said Letters Patent is hereby corrected as shown below:

In Column 5, Line 38, in Claim 3, delete "at a least" and insert --at least-- therefor.

Signed and Sealed this

Eighteenth Day of May, 2010

David J. Kappos
*Director of the United States Patent and Trademark Office*